United States Patent [19]

Albares et al.

[11] Patent Number: 4,930,854
[45] Date of Patent: Jun. 5, 1990

[54] OPTICAL FIBER-TO-CHANNEL WAVEGUIDE COUPLER

[75] Inventors: Donald J. Albares; David B. Cavanaugh; Thomas W. Trask, all of San Diego, Calif.

[73] Assignee: The United States of America as represented by the Secretary of the Navy, Washington, D.C.

[21] Appl. No.: 318,989

[22] Filed: Mar. 3, 1989

[51] Int. Cl.⁵ .............................................. G02B 6/30
[52] U.S. Cl. ................................. 350/96.17; 350/320
[58] Field of Search ............... 350/96.15, 96.17, 96.20, 350/96.21, 96.22, 320; 29/569.1

[56] References Cited

U.S. PATENT DOCUMENTS

| | | | |
|---|---|---|---|
| 3,887,997 | 6/1975 | Hartleroad et al. | 29/569.1 X |
| 3,899,235 | 8/1975 | Arnaud et al. | 350/96 WG |
| 4,097,118 | 6/1978 | Hammer | 350/96.17 |
| 4,130,343 | 12/1978 | Miller et al. | 350/96.15 |
| 4,152,044 | 5/1979 | Liu | 350/96.12 |
| 4,164,363 | 8/1979 | Hsu | 350/96.17 |
| 4,186,994 | 2/1980 | Denkin et al. | 350/96.17 |
| 4,474,429 | 10/1984 | Yoldas et al. | 350/320 |
| 4,664,732 | 5/1987 | Campbell et al. | 350/96.15 X |
| 4,744,619 | 5/1988 | Cameron | 350/96.17 |
| 4,767,174 | 8/1988 | Carenco et al. | 350/96.20 |
| 4,796,975 | 1/1989 | Lukas et al. | 350/320 |

FOREIGN PATENT DOCUMENTS 2191601 12/1987 United Kingdom ............. 350/96.20

OTHER PUBLICATIONS

"Fiber and Integrated Optics Techniques for Radar and Communications Signal Processing," National Telecommunications Conference Record, VIII, pp. 37.5-1 to 37.5-5, Dec., 1976, Dillard, G. M., H. F. Taylor and B. R. Hunt.

"Single Mode Fiber-to-Channel Waveguide Coupling," J. Opt. Comm., 2, 122 (1981), Ramer, O. G.

"Efficient Single-Mode Fiber to Titanium Diffused Lithium Niobate Waveguide Coupling for $\eta = 1.32$ μm", IEEE J. Quantum Electron., QE-18, 1807 (1982), Alferness, R. C. et al.

"High Coupling Efficiencies Between Single Mode Optical Fibers and Ti Diffused LiNbO$_3$ Waveguides," Paper FB3-1, Topical Meeting on Integrated and Guided-Wave Optics, Pacific Grove, Calif., Jan. 6-8, 1982, Papuchon, M., P. Kayoun and Y. Bourbin.

"End Fire Coupling Between Optical Fibers and Diffused Channel Waveguides," Appl. Optics, 16, 2048 (1977), Burns, W. K. and G. B. Hocker.

"Controlled Fiber Optic Switching," Hughes Research Laboratory Air Force Technical Report AFWAL--TR-81-1002, Dec. 1980, Ramer, O. G.

"Optical Fiber-Stripline-Coupler," Appl. Optics, 14, 1225 (1975), Guttmann, J., O. Krumpholz, and E. Pfeiffer.

"Thin-Film Laser-to-Fiber Coupler," Appl. Optics, 13, 391 (1974), L. P. Boivin.

(List continued on next page.)

Primary Examiner—John D. Lee
Attorney, Agent, or Firm—Harvey Fendelman; Thomas Glenn Keough

[57] ABSTRACT

A micromanipulator and UV curing adhesive allows a precise end-on coupling of an optical fiber to a film optical waveguide on a substrate. Such a coupling facilitates the optical processing of data on active or passive optoelectronic chips with the inherent advantages of parallel, high speed capability. After coarse alignment by suitably arranging the chips, each fiber is cemented into an etched V-groove in its Si chip with a UV curing adhesive for coarse positioning and mechanical support a few millimeters away from the waveguide chip. A precision fine alignment of each fiber is assured by the micromanipulator which displaces a hypodermic needle-like chuck to align the fiber with the waveguide. The fiber is finally cemented in place by the curing of a small amount of the UV curable adhesive that is coated on its end.

12 Claims, 3 Drawing Sheets

OTHER PUBLICATIONS

"High Efficiency Flip-Chip Coupling Between Single-Mode Fibers and LiNbO$_3$ Channel Waveguides," Appl. Phys. Lett., 37, 351 (1980), Bulmer, C. H. et al.

"Single-Mode Optical-Waveguide Fiber Coupler," Appl. Optics, 17, 2092 (1978), Noda, J., et al.

"Multiple Fiber End Fire Coupling with Single-Mode Channel Waveguides," Appl. Phys. Lett., 33, 603 (1978), Hsu, H. P., A. F. Milton, and W. K. Burns.

"Experimental Integrated Optic Circuit Losses and Fiber Pigtailing of Chips," IEEE J. Quantum Electron., QE-17, 970, (1981), Ramer, O. G., C. Nelson, and C. Mohr.

"Integrated Optical Switch Matrix for Single-Mode Fiber Networks," IEEE J. Quant. Electron, QE-18, 1759 (1982), Kondo, M. et al.

"Fiber-Break Testing by Interferometry; a Comparison of Two Breaking Methods," Appl. Optics, 16, 818 (1977), Gordon, K. S. et al.

"Defect-Free, Edge Polishing of Lithium Niobate and Other Optical Crystals," NOSC TR-480, Nov. 1980, Schumacher, E. R.

"Fast High-Quality Edge Polishing of LiNbO$_3$," J. Opt. Commun., 4, 47, 1983, Furch, B. et al.

"Norland Products Adhesive 61," Norland Products, Inc., Box 145, North Brunswick, N.J., 08902.

"Optical Cements for Interferometric Applications," Appl. Optics, 23, 1145 (1984), Wimperis, J. R. and Sean F. Johnston.

FIG. I

OPTICAL FIBER-TO-CHANNEL WAVEGUIDE COUPLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Technological advances in optical communications and in optical data processing have seen the emergence of thin-film optical and electro-optical logic elements in conjunction with optical fibers and have led to high speed signal processing concepts wherein fibers would be used as interconnecting optical channels, delay lines or shift registers. Thin film guided wave devices are strong candidates to perform terminal functions in optical fiber communication systems. These applications require practical fiber-to-thin film coupling methods and in some cases precise specification and control over the optical delay from one integrated optical element through an optical fiber to another integrated optical element via some coupling regions.

Consequently, a decisive need has been recognized for a reliable permanent coupling of single mode optical fibers to channel thin-film optical waveguides and efforts are underway to develop the technique for fiber-film channel waveguide coupling with an emphasis on suitability to different waveguide materials, stability and producibility. These desirable characteristics must further be carefully chosen to assure compatibility with existing methods to produce maximum coupling efficiency and with waveguide device requirements such as electrical access.

Some single mode optical fibers and thin-film channel waveguides can be used to perform in the 800-1600 nm wavelength region although other regions can be selected as a particular application dictates. Typically channel waveguides have been fabricated in $LiNbO_3$ by Ti indiffusion ($Ti:LiNbO_3$) or in other transparent substrates with rib or with strip-loaded waveguides since such structures are widely used for active and passive thin film devices.

Designers have two options for coupling the energy from the fiber to the thin-film waveguides, namely via evanescent wave coupling between the two waveguides or by end-on launching. End-on coupling has an appeal due to its applicability to different waveguide materials such as GaAs and $Si_3N_4$ and for simplicity. In fact, in recent years more research has been devoted to the end-on configuration which is practical and not material specific.

Coupling efficiency is vital and clearly a challenge since the optical waveguides are microns in size, mode patterns from two different types of waveguides must be matched, and film and fiber edge conditions must be controlled. Several publications which show the use of fibers and thin-film optical logic elements and the coupling efficiencies of such structures are available, for example the article by G. M. Dillard et al entitled "Fiber and Integrated Optics Techniques for Radar and Communications Signal Processing," *National Telecommunications Conference Record* VIII, pages 37.5-1 to 37.5-5 (December 1976) and 0. G. Ramer's article "Single Mode Fiber-To-Channel Waveguide Coupling," appearing in *J. Opt. Comm.* 2, 122, (1981) and R. C. Alferness's article "Efficient Single-Mode Fiber to Titanium Diffused Lithium Niobate Waveguide Coupling for Lambda Equals 1.32 Micron," *IEEE J. Quantum Electron.* QE-18, 1807, (1982).

The best figures known to be reported for $Ti:LiNbO_3$ waveguides are ninety-five percent ($-0.2dB$) coupling efficiency when Lambda equals 633 nm and a fiber waveguide fiber insertion loss of 1dB for a 1 cm long waveguide when Lambda equals 1.32 microns. These figures were arrived at by R. C. Alferness et al in the article cited above and by M. Papuchon et al in their article entitled "High Coupling Efficiencies Between Single Mode Optical Fibers and Ti Diffused $LiNbO_3$ Waveguides" Paper FB3-1 at the Topical Meeting on Integrated Guided Wave Optics, Pacific Grove, Calif., Jan. 6-8, 1982. Micromanipulators were used to position the fibers in the experiments of these last two articles.

The figures of Alferness and Papuchon exceeded theoretical estimates for this type of coupling, see the article by W. K. Burns et al entitled "End Fire Coupling Between Optical Fibers and Diffused Channel Waveguides" *Applied Optics* 16, 2048, (1977). The couplings of the Burns article involved calculation of the overlap integral of the fiber and channel waveguide modes. The transverse fields of these optical modes are modeled as circular and rectangular Gaussian functions respectively. Optimum conditions for coupling were calculated as well as the adverse effects of waveguide tilt, off-set and end separation. For example, to keep each of these loss contributions below ten percent ($-0.5$ dB) for typical $Ti:LiNbO_3$ waveguides and fibers that tilt should be less than about one degree, the off-set less than about 0.8 microns and the end separation less than about twenty microns, note 0. G. Ramer's "Controlled Fiber Optic Switching" *Hughes Research Laboratory Air Force Technical Report, AFWAL-TR*-81-1002 December 1980.

Although low loss, adjustable connectors have been reported for fiber-film coupling, techniques for permanently joining many fibers to a thin film waveguide chip are needed ultimately. The first adjustable connector applied double eccentric cylindrical supports permitting the alignment of two single-mode waveguide components, see J. Guttmann et al's article "Optical Fiber-Stripline-Coupler" *Applied Optics* 14, 1225 (1975). A second approach uses etched Si V-grooves for fiber positioning, see L. P. Boivin "Thin Film Laser to Fiber Coupler" *Applied Optics* 13, 391 (1974). A flip-chip orientation for the thin film channel waveguides and tapered fibers transverse to the coupling fibers for fine height adjustment is discussed in the article by C. H. Bulmer entitled "High Efficiency Flip-Chip Coupling Between Single-Mode Fibers and $LiNbO_3$ Channel Waveguides" *Applied Physics Letters* 37, 351 (1980). These techniques appear limited to one or two fibers per chip facet.

Other approaches for attaching fibers permanently to $LiNBO_3$ channel waveguides have been implemented in varying degrees. A coupler disclosed by J. Noda et al in the article "Single-Mode Optical Waveguide Fiber Coupler" *Applied Optics* 17, 2092 (1978) holds the fiber in place with a jig attached to the chip carrier. Fine adjustment is accomplished by set screws and a final step of plastic molding fixes the fiber in place. Apparently this approach is not suitable for more than one or two fibers per chip edge owing to the size of the positioning fixture.

Another technique used Si V-grooves to support fibers in positions determined by photolithographic masking and preferential chemical etching. The grooves can be defined to the same accuracy as the channel waveguide lithography and the etching has excellent control and reproducibility. In this scheme the accuracy of a fiber core position naturally depends upon the uniformity of the fiber outer diameter and its concentricity with the core. Various methods are used for aligning the Si carrier chip with the waveguide chip and subsequently cementing them.

Another coupler disclosed by H. P. Hsu et al in "Multiple Fiber End Fire Coupling With Single-Mode Channel Waveguides" *Applied Physics Letters* 33, 603 (1978) uses etched V-grooves in Si for both fiber holding and as alignment markers to bring the flip-chip $LiNbO_3$ waveguides into proper registration before cementing. Fibers are then placed in the grooves, however, permanent attachment was not reported. Another V-groove approach disclosed by O. G. Ramer et al in "Experimental Integrated Optic Circuit Losses and Fiber Pigtailing of Chips" *IEEE J. Quantum Electron.* QE-17,970 (1981) epoxies the fibers in the V-grooves and polishes the Si and fiber end surfaces flat together. Then the Si chip is epoxied to a holder which offers micrometer adjustment in the transverse directions after the epoxy has cured. An initial version had an external micropositioner which adjusted the Si chip into place and was removed after the epoxy step. However, this arrangement apparently tended to suffer misalignment from stress which was placed on the Si chip by the curing epoxy.

A waveguide switch network is coupled to four output fibers in the arrangement disclosed by M. Kondo et al in "Integrated Optical Switch Matrix for Single-Mode Fiber Networks" *IEEE J. Quantum Electronics* QE-18, 1759 (1982). The fibers are sandwiched between two Si chips etched with V-grooves and the chips are positioned and epoxied to a mount carrying the switch chip. Mention is made of the difficulty in epoxying the fibers and Si chips for fine positioning, but the details were not presented.

In summary the methods of the prior art for permanently attaching multiple fibers depend upon aligning them relative to each other by their outer diameters using the very accurate V-grooves. Thus, the core locations depend upon the fiber qualities of circularity and concentricity. The Si chip is then positioned to align the V-grooves or the fibers in them with the channel waveguides and an adhesive is applied to fix positions. Apparently, the chip positioning can be done well within the required accuracy but stress from the curing epoxy causes misalignment.

Thus, a continuing need exists in the state of the art for an optical fiber to channel waveguide coupler that accurately positions end-on couplings for being cemented in place without the creation of misaligning strains.

SUMMARY OF THE INVENTION

The present invention is directed to providing a method and apparatus for fabricating an end-on coupling between a single mode optical fiber and a thin-film waveguide structure. The end-on optically coupling of an optical fiber is made to an optical waveguide on a waveguide chip that is mounted on a base. A silicon chip also is mounted on the base and is provided with at least one V-shaped groove that may be coarse aligned with the optical waveguide. Applying a UV curable adhesive in the V-shaped groove and on an end of the optical fiber precedes the placing of the optical fiber in the U-shaped groove to position an overhanging section including the end of the optical fiber adjacent the optical waveguide. The end of the optical fiber thusly is positioned to a desired coarse optical alignment with the optical waveguide. After the end of the optical fiber has been appropriately positioned, UV energy is radiated onto the UV curable adhesive to secure the optical fiber in the V-shaped groove. A hypodermic needle sized vacuum chuck displaced by a micromanipulator assures the precise fine positioning of the end of the fiber with respect to the optical waveguide so that the final position of desired optical alignment is achieved. Coating the end of the optical fiber with a layer of UV curable optical cement to a thickness of about 10 microns and radiating this coating with UV energy assures that a precisely aligned and acceptable optical coupling is created. Optionally, both the V-shaped groove and fiber end can be coated with a UV curable optical cement and simultaneously radiated with UV energy to secure both portions of the fiber at the same time. Coarse vertical, lateral and angular alignment between the U-shaped groove and the optical waveguide precedes and aids in the later precise positioning of the fiber end with respect to the optical waveguide. Since the vacuum chuck is approximately hypodermic needle sized, a plurality of adjacent V-shaped grooves and appropriately similarly disposed optical waveguides can be optically interconnected within the small dimensions common to integrated chip technologies.

An object of the invention is to provide for an optical fiber interconnection to a thin-film channel waveguide.

Another object is to provide a secure interconnection between an optical fiber and a thin-film channel waveguide that gives a robust support to the optical fiber.

Another object of the invention is to provide an assembly technique for edge-on coupling of optical fibers to thin-film channel waveguides with a selective or enhanced optical coupling.

Still another object of the invention is to provide for an assembly technique for edge-on coupling of optical fibers to thin-film channel waveguides performed in steps to give a coarse and fine adjustment to maximize strength and the optical coupling and to minimize the thermal stresses associated with the curing of the optical cement (adhesive).

Still another object of the invention is to provide an assembly technique for optically coupling fibers to thin-film channel waveguides that employs a micropositioner and a UV curable adhesive for aligned secure optical interconnections.

A further object of the invention is to provide an assembly technique suitable for close spaced arrays of fibers that assures their secure and aligned optical coupling to an array of optical waveguide components on a substrate.

Yet another object is to provide an assembly technique that combines the precision alignment of each fiber by the micromanipulator positioning of each fiber and the permanent securing of each fiber by cementing each fiber in place with associated mechanical support.

Still another object is to provide a relatively small sized needle vacuum chuck coupled to a micromanipulator to assure individual alignment of fibers and to locate the major strength supports apart from the fiber-film interfaces.

These and other objects of the invention will become more readily apparent from the ensuing specification and claims when taken in conjunction with the drawings.

DESCRIPTION OF THE PREFERRED EMBODIMENT

This technique for coupling fibers to thin-film waveguides retains the considerable advantage of the Si V-grooves in supporting fiber arrays, retains fine micromanipulator final adjustments to accommodate imperfections in fibers, V-grooves and channel waveguide positions, and minimizes stress from adhesive (optical cement) curing and thermal changes.

Figure 1:
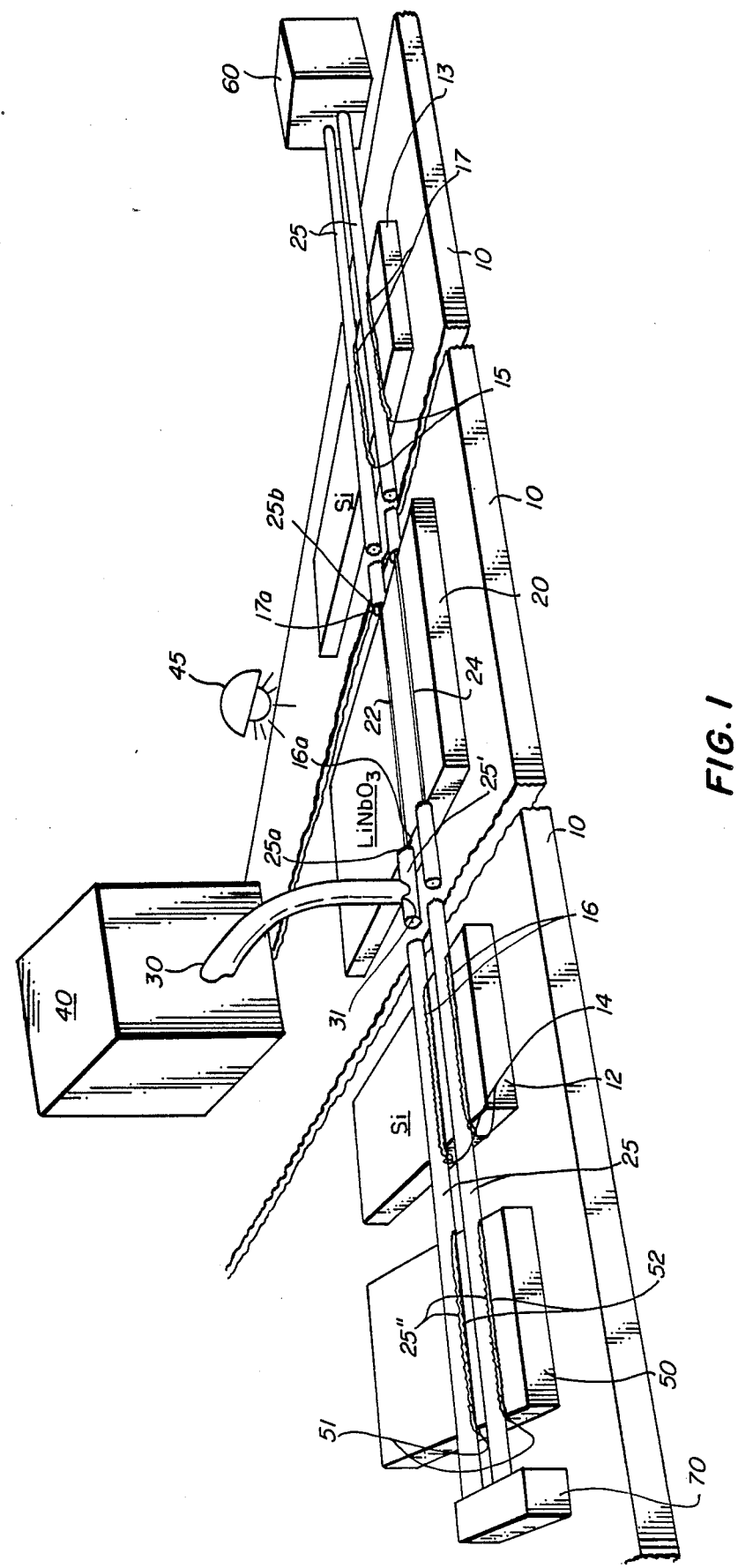
FIG. 1 depicts an illustrative example of this concept.

Referring to FIG. 1 a substrate 10, a glass carrier for example, provides a rigid mounting surface for Si chips 12 and 13. Each of the chips are shaped with one or a multitude of V-grooves, although only two V-grooves 14 or 15 are shown for the purposes of demonstrating this inventive concept. The chips are located on carrier 10 in a spaced relationship of about 10 mm from a LiNbO$_3$ waveguide chip facet 20 provided with a like number of thin-film waveguides 22 and 24 although a multitude of waveguides and associated optical processing elements with electronics could be included as a matter of choice. The unending possibilities of opto-electronic configurations that are conceivable for application with this concept are herein dispensed with to avoid unnecessary cluttering and detraction from this straightforward, uncomplicated concept. It is obvious to a routineer that a host of other optical transmissive and processing elements could be substituted for the waveguides 22 and 24 and their numbers increased substantially.

A coarse alignment is determined by the alignment of the V-grooves with the thin-film waveguides and is roughly within the 10 microns. The vertical coarse alignment is determined by the depth of the V-grooves 14 and 15, the thickness of chips 12, 13 and 20 and the thickness of the cement or bonding agent holding chips 12, 13 and 20 to the common substrate or carrier 10. Transverse and angular coarse alignments of V-grooves 14 and 15 and waveguides 22 and 24 are accomplished by bringing them into registration with a microscope filar or by reference to chip edges, other grooves or lithographic markers, all of which are well known coarse alignment techniques to those skilled in this particular art. Optical fibers 25 are secured in V-grooves 14 and 15 by UV curable optical cement or adhesive 16 and 17 to the Si chips 12 and 13 to hold the fibers in their relatively coarse alignment with thin-film waveguides 22 and 24 in waveguide chip facet 20.

Figure 2:
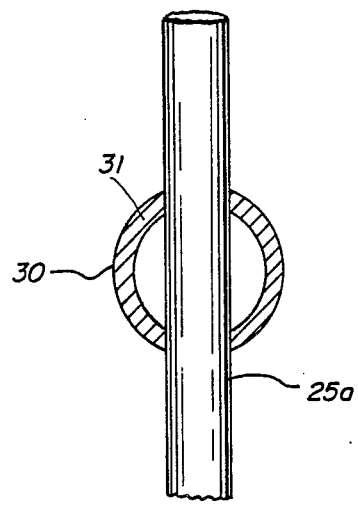
FIG. 2 shows a vacuum chuck supporting an optical fiber.

Two possible sequences can be followed for bonding the fibers to the chips and the waveguides. One sequence calls for the placing of a fiber, for example, upper fiber 25 in FIG. 1 in a V-groove 14 and applying a small amount of a UV curable optical cement 16a in just the right amount to cover the fiber end face 25a. A vacuum chuck in the shape of a vacuum needle 30 has an appropriately configured grooved end 31, see FIG. 2, to fit about a portion 25' of fiber 25. The vacuum chuck is connected to a three axis micromanipulator 40 that is appropriately actuated to position the vacuum chuck so that portion 25' of fiber 25 is precisely aligned with waveguide 22 to provide a maximum optical transmission or a desired degree of transmission as required by a particular need in accordance with techniques well known to those skilled in this art.

At this time a UV light source 45 is actuated and UV light impinges upon cement 16a to cure it where it covers the end of fiber 25' and the end of thin-film waveguide 22 in chip 20. When the UV light is applied the cement holds the fiber in a precisely aligned relationship with respect to waveguide 22, such a precisely aligned relationship being determined by appropriate actuation of micromanipulator 42 which appropriately displaces vacuum chuck 30.

After the UV curable cement or adhesive 16a has cured, UV light source 45 is once again actuated to shine upon the adhesive 16 in groove 14 to cure (harden) it. This securely, mechanically anchors fiber 25 with respect to chip 12 as well as securing the aligned relationship to waveguide 22 in chip 20.

The other sequence for bonding the fibers calls for applying a coating or layer of UV curable optical cement or adhesive 16 in V-groove 14 and placing a fiber 25 in the same V-groove 14 of Si chip 12. More of the UV curable adhesive 16 may be applied if desired to assure the securing of the fiber. UV source 45 is turned on to flood UV energy onto the cement to secure the fiber in place.

With the fiber secured onto chip 12, adhesive 16a is applied to the gap between fiber end 25a and the end of waveguide 22. Next, the fine alignment procedure is effected by the micromanipulator and vacuum chuck. When the desired alignment is established, UV radiation from a UV source 45 cures and hardens adhesive 16a.

The second technique has the flexibility in that the fiber or fibers can be cemented onto a Si carrier such as 12 or 13 and remain in place for an arbitrary curing period after which time the final fiber end positioning, aligning and cementing can occur. However, with the later technique the application of cement to the fiber-film gap requires an extra step. The UV curable adhesive can be applied to the gap itself or the fiber can be raised above the waveguide chip by the vacuum needle to expose the fiber face for the application of the UV curable adhesive. In either case the technique for applying only the added, relatively small amount of adhesive requires further attention (curing).

Thus, by separating the V-groove fiber chip supports 12 and 13 from the fine positioned fiber end 25a by a distance of 50 to 100 fiber diameters (about 10 mm), the stresses otherwise attendant a final fiber alignment and long-curve cement curing in the V-grooves are considerably reduced at the fiber-waveguide coupling. Furthermore, applying the small amount of cement that only fills the fiber end (25a)-chip gap (at waveguide 22) minimizes curing stress at that point. The small amount of cement also furnished sufficient strength to maintain the fiber in its fine-positioned place and provides some index matching for the optical coupling. By using the small needle vacuum chuck a fiber can be manipulated to a closely spaced array and allows a number of fibers to be cemented and cured in place. Withdrawal of the chuck is preceeded by turning off the vacuum and will not disturb the cemented coupling.

Micromanipulator 40 used to precisely position the fibers with respect to waveguides on the LiNbO$_3$ chip was a Model No. 6000 marketed by Micromanipulator Incorporated of Escondido, Calif. Another acceptable positioner would be the Model A manufactured by Line Tool Incorporated of Pittsburgh, Pa. Any standard XYZ micromanipulators are suitable for holding the vacuum chuck. Either of these positioners provide for vertical and horizontal precise location of the fiber with respect to thin-film waveguides. They have the capability for three axis positioning if needed in certain applications.

Vacuum chuck 30 was adapted from a unit that was used to handle semiconductor chips. A stainless steel tube of hypodermic needle sized dimensions had an outer diameter of 400 microns and an inner diameter of 225 microns. It was modified to have a grooved end 31 that conformed to the 125 micron cylindrical shape of the fiber. A standard vacuum pump, not shown, was attached to the chuck via a length of flexible plastic tubing, not shown, and the force exerted on the fiber was sufficient to lift it and was more than adequate for positioning the fiber in place. Because of the narrow dimensions of the hypodermic needle sized vacuum chuck, fibers can be spaced together to dimensions that approach the needle outer radius plus the fine movement necessary for final positioning.

As mentioned above, although only two fibers are shown in FIG. 1, it is apparent that for the needle chuck, optical fiber and typical movements used, approximately a 325 micron fiber center-to-center spacing could be used for optical coupling of fibers in appropriately located V-grooves and thin-film waveguides so that a considerable number of fibers could be accommodated and precisely aligned in the tight confines of an intense optical integrated circuit configuration. Obviously, there is ample room to reduce these figures even more through use of smaller needles and better V-groove to waveguide alignments.

Figure 3:
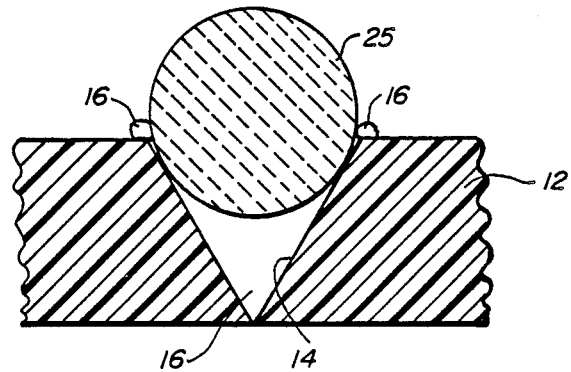
FIG. 3 depicts a cross-sectional view of a V-groove.

The Si V-grooves were etched in the usual way through a one micron thick SiO$_2$ pattern fabricated by standard photolithographic techniques. The etchant was KOH and the chip had 100 orientation. Looking to FIG. 3 a typical well defined V-groove 14 can thusly be configured in its chip 12 to have a 70.5 degree vertex angle.

The optical cement used to secure the fibers in this V-groove as well as in the amounts 16a on the end of the fibers was a commercially available adhesive designated Norland Optical Adhesive 61 marketed by Norland Products, Incorporated, Box 145, North Brunswick, N.J. The selected adhesive is a 1-part liquid photopolymer that cures when exposed to UV light. Characteristics include good adhesion, low shrinkage, flexibility and n approximately equal to 1.5 and it is usable in interferometric applications.

UV source 45 radiated about one milliwatt per centimeter squared and effect curing of the adhesive 61 after about 2 minutes. Complete curing was achieved after about 15 minutes with the selected fiber.

The selected fiber was a Corning optical fiber having a 780 nm cutoff, and 8 micron outer diameter. Losses were about 8.7 db per kilometer and the plastic coating could be removed mechanically or with acetone. The fiber ends were cleaved by the well known manual scribe and break method and the fiber end surfaces were tested by an interferometer which measured their flatness and perpendicularity to the fiber axis.

Accurate positioning of fibers 25 in V-grooves 14 and 15 require that they be stripped of their plastic buffered coating. As a consequence, the exposed fiber is weakened and further support was found necessary where these fibers emerge from the assembly of chips 12, 20 and 13. Additional, larger inline blocks 50 were etched with V-grooves 51 to hold UV adhesive 52 securing a 5 to 10 mm long coated section 25'' of the fiber. This gave a robust mechanical support that eliminated fiber breakage after attachment and allowed handling of the completely assembly throughout the alignment procedures.

The channel waveguides, of which waveguides 22 and 24 were discussed above, were fabricated by Ti indiffusion in Z-cut LiNbO$_3$ to have a 2.0 cm length. Widths of the channel waveguides ranged from 4 microns to 8 microns and their attenuation was estimated to be a few db per centimeter although lower attenuation rates are presently within the capabilities of the state of the art. Conventional polishing techniques were applied to the entrance of the waveguides and exit facets to give nearly featureless edges under a 600 power optical magnification. They supported few modes at 630 nm and were single mode at 830 nm.

The LiNbO$_3$ chip 20, the Si V-groove chips 12 and 13 and optical fibers 25 were assembled and supported by a microscope slide 10. Chip 20 was cemented with channel waveguides 22 and 24 positioned parallel to a reference edge on the microscope slide. A simple jig positioned another reference edge parallel to the entrance facet of chip 20 so that the Si chip 12 could slide along at the desired distance. Since the Si material can be etched and cleaved on photolithographically defined lines, this allows the maintenance of the V-grooves 14 and channel waveguides 22 and 24 parallel while sliding them into transverse alignment.

The Ti:LiNbO$_3$ waveguides are readily observable through a vertical illumination microscope due to the slight bulge created by the Ti indiffusion. In the coarse alignment step a low magnification (10 power) was used to view a spot 2 cm in diameter which included V-grooves 14, the gap between chip 12 and chip 20 and waveguides 22 and 24. With a filar eyepiece the waveguides and the V-grooves were aligned to within a 10 micron offset. Chip 12 as well as chip 13 were then cemented in place. Angular alignment is controlled by the assembly fixtures and is easily maintained within 1 degree deviation.

To elaborate on the sequences referred to above, a drop of the UV cement is applied just covering the fiber end 25a and the fiber is placed in the V-groove where it is grasped 1 to 2 mm from its end by vacuum needle 30. The fiber slides forward in the V-groove until the cement contacts the waveguide chip and the fiber end is within about 10 microns of the chip. In the preferred sequence cement is first applied to the V-groove and cured. The optical transmission is then maximized by fine manipulation of the needle, the end cement cured and the vacuum needle released. Optical transmission is monitored by an appropriately disposed detector 60 and that receives light that comes from a light source 70 so that a technician gets an indication when optimum or a desired alignment is attained.

Referring once again to FIG. 1, light source 70 is suitably optically coupled to fibers 25 to inject light at the proper wavelength so that a detector 60 can provide representative signals when the predetermined or maximum values are monitored. Detector 60 may be moved to the output end of thin-film waveguide 22 or a mirror or other light transmissive member may be interposed to direct light to the detector as end 25a is being displaced by manipulator 40. When a maximum or predetermined magnitude is monitored, then the UV radiation source 45 is actuated to cure the adhesive. Detector 60 may then be moved to the far right end of fiber 25 when its end 25b is being positioned by the micropos100itioner. Curing of adhesive 17a will secure end 25b when a predetermined or maximum transmitted signal is monitored.

Throughout the foregoing description the optical structure on the chip 20 has been portrayed as a pair of parallel thin-film waveguides 22 and 24. As mentioned above, this arrangement has been presented for purposes of demonstration only. The waveguides can be optically coupled to a host of suitable thin-film or electro-optic processing components and the like which may be fabricated in an integrated circuit fashion on chip 20. Outputs from chip 20 could be not only the two interconnections shown with waveguides 22 and 24 but to a multitude of output ports to adjacent chips or to fibers such as shown, which are attached to chip 20 in the manner described above.

Figure 4:
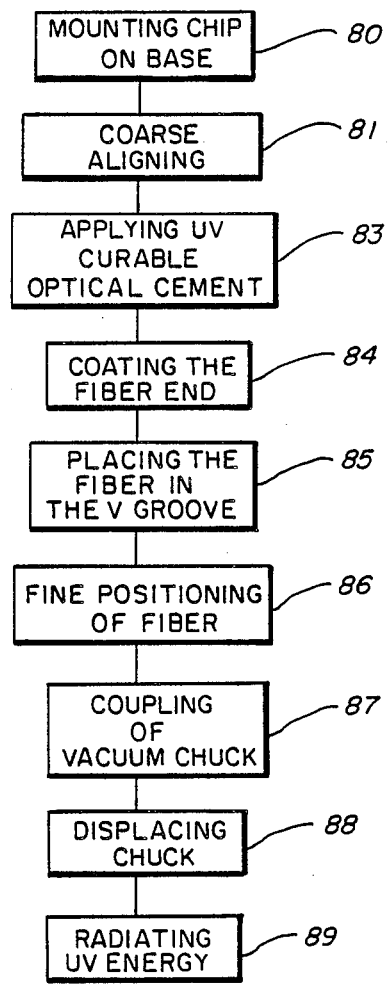
FIG. 4 is an aid to describing this inventive concept.

Looking now to FIG. 4 of the drawings, the present method for fabricating an end-on coupling between a single mode optical fiber and a thin-film waveguide structure is set forth in graphic format to enable a more thorough understanding of this inventive concept. The end-on optical coupling of an optical fiber is made to an optical waveguide on a waveguide chip that is mounted on a base. Mounting 80 a semi-conductor chip on the base that is provided with at least one V-shaped groove allows a subsequent coarse aligning 81 with the optical waveguide. Applying 83 a UV curable optical cement in the V-shaped groove and on an end of the optical fiber precedes the placing 85 of the optical fiber in the V-shaped groove and the positioning 86 of an overhanging section including the end of the optical fiber adjacent the optical waveguide. The end of the optical fiber thusly is located to a desired coarse optical alignment with the optical waveguide. After the end of the optical fiber has been appropriately located, radiating 89 UV energy onto the UV curable adhesive secures the optical fiber in the V-shaped groove. A hypodermic needle sized vacuum chuck displaced by a micromanipulator assures the precise fine positioning 86 of the end of the fiber with respect to the optical waveguide by the coupling 87 of the chuck to the fiber so that the selective displacing 88 of the chuck and fiber can effect the desired optical alignment. Coating 84 the end of the optical fiber with a layer of UV curable optical cement to a thickness of about 10 microns and radiating 89 this coating with UV energy assures that a precisely aligned and acceptable optical coupling is created. Optionally, there can be a coating 84 of both the V-shaped groove and fiber end with a UV curable optical cement and simultaneously radiating 89 with UV energy to secure both portions of the fiber at the same time. Coarse vertical, lateral and angular aligning 81 between the V-shaped groove and the optical waveguide precedes and aids in the later precise, fine positioning 86 of the fiber end with respect to the optical waveguide. Since the vacuum chuck is approximately hypodermic needle sized, a plurality of adjacent V-shaped grooves and appropriately similarly disposed optical waveguides can be optically interconnected within the small dimensions common to integrated chip technologies.

Obviously, many other modifications and variations of the present invention are possible in light of the above teachings. It is therefore to be understood that within the scope of the claims the invention may be practiced otherwise than as specifically described.

What is claimed is:

1. A method of end-on optically coupling an optical fiber to an optical waveguide on a waveguide chip mounted on a base comprising:

mounting a semiconductor chip provided with a V-shaped groove on said base in a spaced-apart relationship with said waveguide chip;

applying a UV curable optical cement in said V-shaped groove and on an end of said optical fiber after the step of mounting;

placing said optical fiber in said V-shaped groove to locate an overhanging section including said end adjacent said optical waveguide after the step of applying;

positioning said end of said optical fiber to a position of desired optical alignment with said optical waveguide after the step of placing; and radiating UV energy on said UV curable optical cement to cure it and to secure said optical fiber in said V-shaped groove and said end of said optical fiber in said position of said desired optical alignment after the step of positioning.

2. A method of end-on optically coupling an optical fiber to an optical waveguide on a waveguide chip mounted on a base comprising:

mounting a semiconductor chip provided with a V-shaped groove on said base in a spaced-apart relationship with said waveguide chip;

applying a UV curable optical cement in said V-shaped groove and on an end of said optical fiber;

placing said optical fiber in said V-shaped groove to locate an overhanging section including said end adjacent said optical waveguide;

positioning said end of said optical fiber to a position of desired optical alignment with said optical waveguide; and radiating UV energy on said UV curable optical cement to cure it and to secure said optical fiber in said V-shaped groove and said end of said optical fiber in said position of said desired optical alignment, the step of positioning includes the coupling of said overhanging section to a hypodermic-needle sized vacuum chuck and the selective displacing of said vacuum chuck and said overhanging section in a vertical and in a lateral plane by a micromanipulator to said position of said desired optical alignment.

3. A method according to claim 2 in which the step of applying of said UV curable optical cement on said end of said optical fiber is the coating of said UV curable optical cement to a thickness of about 10 microns which contacts said optical waveguide.

4. A method according to claims 1, 2 or 3 in which the step of radiating UV energy is first on said UV curable optical cement in said V-shaped groove to allow for the curing thereof firstly and second on said UV curable optical cement on said end of said optical fiber to allow for the curing thereof secondly.

5. A method according to claim 4 in which the step of mounting includes the coarse aligning and cementing of said semiconductor chip on said base to provide a coarse vertical, lateral and angular alignment between the V-shaped groove and said optical waveguide on said waveguide chip.

6. A method according to claim 4 in which a plurality of V-shaped grooves is provided in said semiconductor chip that are coarsely aligned with a like plurality of similarly disposed optical waveguides on a waveguide chip, the step of positioning includes the coupling of said overhanging section to a hypodermic-needle sized vacuum chuck and the lateral separation of said grooves and said optical waveguides being relatively close due to the dimensions of said hypodermic-needle sized vacuum chuck.

7. A method according to claims 1, 2, or 3 in which the step of mounting includes the coarse aligning and cementing of said semiconductor chip on said base to provide a coarse vertical, lateral and angular alignment between the V-shaped groove and said optical waveguide on said waveguide chip.

8. A method according to claim 7 in which a plurality of V-shaped grooves is provided in said semiconductor chip that are coarsely aligned with a like plurality of similarly disposed optical waveguides on a waveguide chip, the step of positioning includes the coupling of said overhanging section to a hypodermic-needle sized vacuum chuck and the lateral separation of said grooves and said optical waveguides being relatively close due to the dimensions of said hypodermic-needle sized chuck.

9. A method according to claims 1, 2, or 3 in which a plurality of V-shaped grooves is provided in said semiconductor chip that are coarsely aligned with a like plurality of similarly disposed optical waveguides on a waveguide chip, the step of positioning includes the coupling of said overhanging section to a hypodermic-needle sized vacuum chuck and the lateral separation of said grooves and said optical waveguides being relatively close due to the dimensions of said hypodermic-needle sized vacuum chuck.

10. A method according to claim 1, 2 or 3 in which the step of radiating UV energy is first on said UV curable optical cement on said end of said optical fiber to allow for the curing thereof firstly and second on said UV curable optical cement in said V-shaped groove to allow for the curing thereof secondly.

11. A method according to claim 10 in which the step of mounting includes the coarse aligning and cementing of said semiconductor chip on said base to provide a coarse vertical, lateral and angular alignment between the V-shaped groove and said optical waveguide on said waveguide chip.

12. A method according to claim 10 in which a plurality of V-shaped grooves is provided in said semiconductor chip that are coarsely aligned with a like plurality of similarly disposed optical waveguides on a waveguide chip, the step of positioning includes the coupling of said overhanging section to a hypodermic-needle sized vacuum chuck and the lateral separation of said grooves and said optical waveguides being relatively close due to the dimensions of said hypodermic-needle sized vacuum chuck.

* * * * *